United States Patent [19]

Price

[11] Patent Number: 5,486,807
[45] Date of Patent: Jan. 23, 1996

[54] LOW OR FLAT TIRE WARNING SYSTEM

[76] Inventor: Ray M. Price, 7015 N. Greenwich Ave., Portland, Oreg. 97217

[21] Appl. No.: 212,125

[22] Filed: Mar. 14, 1994

[51] Int. Cl.$^6$ ................................... B60C 23/00
[52] U.S. Cl. .................. 340/443; 340/438; 340/440; 340/442; 200/61.52; 116/34 R
[58] Field of Search .................. 340/438, 440, 340/442, 443; 116/34 R; 200/11 G, 61.45 R, 61.52, 52 A; 73/146.2

[56] References Cited

U.S. PATENT DOCUMENTS

| | | | |
|---|---|---|---|
| 2,417,940 | 3/1947 | Lehman | 340/442 |
| 2,469,931 | 5/1949 | Pratt | 340/443 |
| 2,499,669 | 3/1950 | Murat | 340/443 |
| 3,608,923 | 9/1971 | Houfek, Sr. | 280/104.5 |
| 3,614,122 | 10/1971 | Herren | 340/443 |
| 4,075,602 | 2/1978 | Clothier | 340/443 |
| 4,173,011 | 10/1979 | Gibson | 340/443 |
| 5,036,307 | 7/1991 | Reavell et al. | 340/487 |
| 5,166,663 | 11/1992 | Leis | 340/433 |

FOREIGN PATENT DOCUMENTS 1808590  6/1970  Germany .

*Primary Examiner*—Jeffery A. Hofsass
*Assistant Examiner*—Julie Lieu

[57] ABSTRACT

A tire pressure warning system for use under a frame of a tandem axle vehicle comprising a plurality of springs, each spring having one end adapted to be coupled to an equalizer mechanism and the other end adapted to be coupled to the frame, an equalizing mechanism for equalizing the position of each spring relative to each axle when the pressure in the tires on each axle has been set, and an indicator mechanism coupled to the equalizing mechanism for determining and showing when the equalizing mechanism has been displaced, whereby providing confirmation of lost tire pressure.

1 Claim, 4 Drawing Sheets

LOW OR FLAT TIRE WARNING SYSTEM

BACKGROUND OF THE INVENTION

1. Field of the Invention

The present invention relates to a tire pressure warning system and more particularly pertains to a tire pressure warning system for monitoring the tire pressure on a tandem axle vehicle.

2. Description of the Prior Art

The use of tire pressure warning systems is known in the prior art. More specifically, tire pressure warning systems heretofore devised and utilized for the purpose of monitoring the tire pressure on a tandem axle vehicle are known to consist basically of familiar, expected and obvious structural configurations, notwithstanding the myriad of designs encompassed by the crowded prior art which have been developed for the fulfillment of countless objectives and requirements.

By way of example, the prior art discloses tire pressure warning devices in U.S. Pat. Nos. 3,602,885 to Grajeda; 4,355,298 to Jessup; 4,476,455 to Kawakami; 4,574,267 to Jones; and 5,032,822 to Sweet.

While these devices fulfill their respective, particular objective and requirements, the aforementioned patents do not describe a tire pressure warning system that is uniquely adapted to be utilized on a tandem axle vehicle, especially on recreational vehicles such as travel trailers or any other vehicles with leaf spring suspension systems.

In this respect, the tire pressure warning system according to the present invention substantially departs from the conventional concepts and designs of the prior art, and in doing so provides an apparatus primarily developed for the purpose of monitoring the tire pressure on a tandem axle vehicle.

Therefore, it can be appreciated that there exists a continuing need for new and improved tire pressure warning systems which can be used for monitoring the tire pressure on a tandem axle vehicle. In this regard, the present invention substantially fulfills this need.

SUMMARY OF THE INVENTION

In the view of the foregoing disadvantages inherent in the known types of tire pressure warning systems now present in the prior art, the present invention provides an improved tire pressure warning system. As such, the general purpose of the present invention, which will be described subsequently in greater detail, is to provide a new and improved tire pressure warning system and method which has all the advantages of the prior art and none of the disadvantages.

To attain this, the present invention essentially comprises a left front leaf spring, a right front leaf spring, a left rear leaf spring, and a right rear leaf spring, each leaf spring having a front end, a rear end, and an intermediate portion therebetween, the intermediate portions of the left and right front leaf springs adapted to be aligned with and coupled to a front axle having inflatable tires disposed thereon, the intermediate portion of the left and right rear leaf springs adapted to be aligned with and coupled to a rear axle having inflatable tires disposed thereon, the front ends of the right front and left front leaf springs and the rear ends of the right rear and left rear leaf springs adapted to be offset and coupled to the frame of a tandem axle vehicle. The system further comprises a left and right bar, each having an upper surface, a lower surface, a left end, a right end, a leading edge, a trailing edge. The system further comprises a left front link, a left rear link, a right front link, and a right rear link, the left front link pivotally coupled between the rear end of left front leaf spring and the left end of the equalizer bar near the leading edge, the left rear link pivotally coupled between the front end of left rear leaf spring and the left end of the equalizer bar near the trailing edge, the right front link pivotally coupled between the rear end of right front leaf spring and the right end of the equalizer bar near the leading edge, the right rear link pivotally coupled between the front end of right rear leaf spring and the right end of the equalizer bar near the trailing edge, the links enabling the equalizer bar to rotate about its central and cross axes when unequal load conditions exist on the leaf springs. The system further comprises a left and a right support bar, each bar having an upper end and a lower end, the upper end of each bar adapted to be coupled to the frame of a vehicle, the lower end of the left support bar coupled to the left end of the equalizer bar between the left front link and the left rear link, the lower end of the right support bar coupled to the right end of the equalizer bar between the right front link and right rear link. The system further comprises a left front mercury switch, a left rear mercury switch, a right front mercury switch, and a right rear mercury switch, each mercury switch further comprising an elongated, hollow, and sealed container having a first end and a second end, liquid mercury disposed within the container to flow between the first end and the second end thereof when tilted, and a terminal coupled to the second end to contact the liquid mercury, whereby when the mercury is contained in the first end, the mercury switch is disengaged, and when the mercury is contained in second end, the mercury switch is engaged, the left front mercury switch disposed near the left end of the equalizer bar with the second end of the switch adjacent to the leading edge, the left rear mercury switch disposed near the left end of the equalizer bar with the second end of the switch adjacent to the trailing edge, the right front mercury switch disposed near the right end of the equalizer bar with the second end of the switch adjacent to the leading edge, and the right rear mercury switch disposed near the right end of the equalizer bar with the second end of the switch adjacent to the trailing edge. A plurality of wires are adapted to carry electrical power from an external power source. The system further comprises an indicator panel adapted to be coupled to the dashboard within a driver's compartment of a vehicle, the indicator panel further having an indicator circuit coupled thereto, the indicator circuit adapted to be coupled to an external power source, the indicator circuit further comprising a left front light, a left rear light, a right front light, a right rear light, and a central light, the left front light electrically connected in series to the left front mercury switch with a wire, the left rear light electrically connected in series to the left rear mercury switch with a wire, the right front light electrically connected in series to the right front mercury switch with a wire, the right rear light electrically connected in series to the right rear mercury switch with a wire, the central light electrically connected in parallel to the left front light with a wire, the left rear light with a wire, the right front light with a wire, and the right rear light with a wire, the left front light, the left rear light, the right front light, and the right rear light adapted to provide an indication of lost pressure in a given tire, the central light adapted to provide a indication of lost pressure in any of the tires. A controller switch is operable in one orientation to energize the indicator circuit and in another orientation to de-energize the indicator circuit, whereby when the warning system is coupled to a vehicle and energized, and a tire on the vehicle loses pressure, the equalizer bar rotates about its central and cross axes due to the unequal load conditions on the tires, causing the mercury switch located in the direction of equalizer bar rotation to engage and activate the appropriate light on the indicator panel.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

An even further object of the present invention is to provide a new and improved tire pressure warning system which is susceptible of a low cost of manufacture with regard to both materials and labor, and which accordingly is then susceptible of low prices of sale to the consuming public, thereby making such a tire pressure warning system economically available to the buying public.

Still yet another object of the present invention is to provide a new and improved tire pressure warning system which provides in the apparatuses and methods of the prior art some of the advantages thereof, while simultaneously overcoming some of the disadvantages normally associated therewith.

Even still another object of the present invention is to provide a new and improved tire pressure warning system for monitoring the tire pressure on a tandem axle vehicle.

Even still another object of the present invention is to provide a new and improved tire pressure warning system that can be used on recreational vehicles such as travel trailers, 5th wheels, or any other vehicle having a tandem leaf spring suspension system, both towed and untowed.

Even still another object of the present invention is to provide a new and improved tire pressure warning system that alerts the driver in the event of an air leak or flattening of the tires.

Even still another object of the present invention is to provide a new and improved tire pressure warning system that provides a visual or audible signal to alert the driver of a problem with the tires.

Even still another object of the present invention is to provide a new and improved tire pressure warning system that employs the use of mercury switches to alert the driver of a problem with the tires.

Lastly, it is an object of the present invention to provide a new and improved tire pressure warning system for use under a frame of a tandem axle vehicle comprising a plurality of springs, each spring having one end adapted to be coupled to an equalizer bar and the other end adapted to be coupled to the frame, equalizing means for equalizing the position of each spring relative to each axle when the pressure in the tires on each axle has been set, and indicator means coupled to the equalizing means for determining and showing when the equalizing means has been displaced, whereby providing confirmation of lost tire pressure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
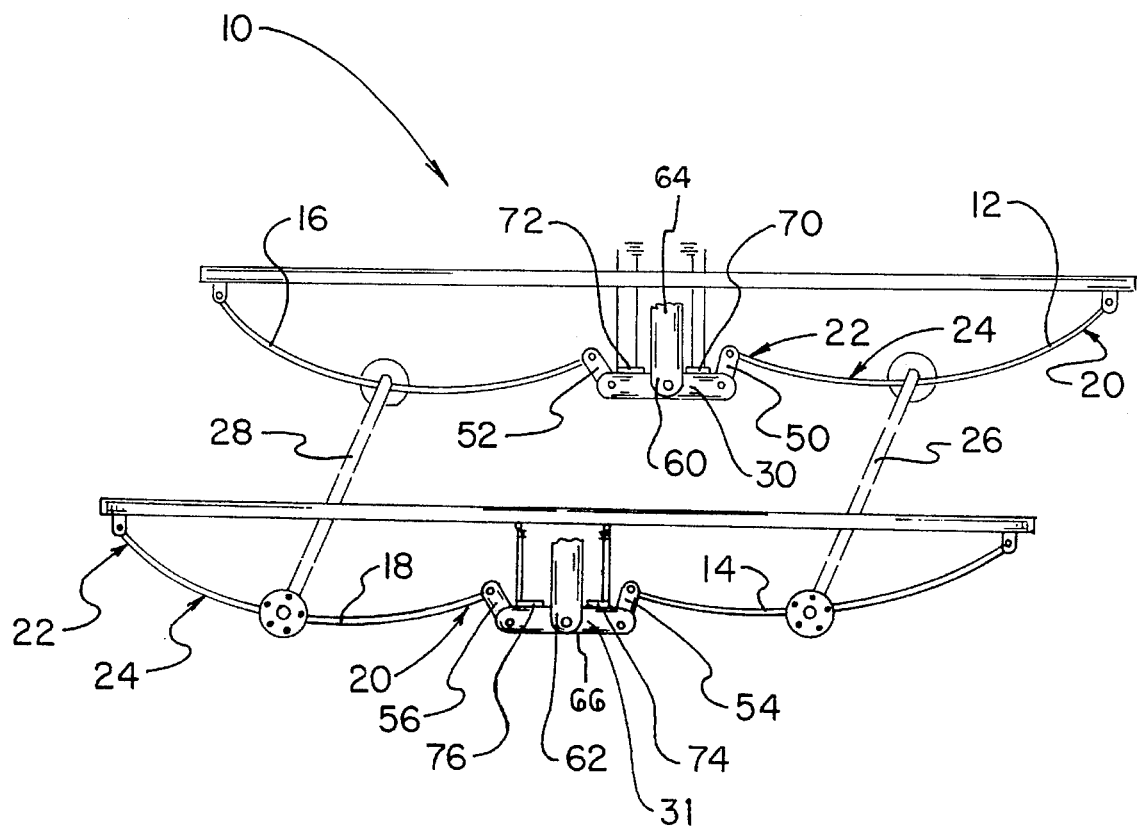
FIG. 1 is a perspective view of the preferred embodiment of the tire pressure warning system constructed in accordance with the principles of the present invention.

With reference now to the drawings, and in particular, to FIG. 1 thereof, the preferred embodiment of the new and improved tire pressure warning system embodying the principles and concepts of the present invention and generally designated by the reference number 10 will be described.

More specifically, it will be noted in the various Figures that the tire pressure warning system 10 for use under a frame of a tandem axle vehicle comprises a left front leaf spring 12, a right front leaf spring 14, a left rear leaf spring 16, and a right rear leaf spring 18. Each leaf spring has a front end 20, a rear end 22, and an intermediate portion 24 therebetween. The intermediate portions of the left and right front leaf springs 12, 14 are adapted to be aligned with and coupled to a front axle 26 having inflatable tires disposed thereon. The intermediate portion 24 of the left and right rear leaf springs 16, 18 are adapted to be aligned with and coupled to a rear axle 28 having inflatable tires disposed thereon. The front ends 20 of the right front and left front leaf springs 14, 12 and the rear ends 22 of the right rear and left rear leaf springs 18, 16 are adapted to be offset and coupled to the frame of a tandem axle vehicle such as a travel trailer, boat, or any other towed or untowed vehicle adapted to use a tandem axle leaf spring suspension system.

The device includes two equalizer bars 30, 31. Each equalizer bar has an upper surface 32, a lower surface 34, a left end 36, a right end 38, a leading edge 40, a trailing edge 42, a central axis 44 defined between the left and right ends, and a cross 46 axis defined perpendicular to the central axis. One equalizer bar 30 is disposed between and offset below the rear end 22 of the left front leaf spring 12 and front end 20 of the left rear leaf spring 16. The other equalizer bar 31 is disposed between and offset below the rear end 22 of the right front leaf spring 14 and the front end 22 of the right rear leaf spring 18. The leading edges 40 of the equalizer bars 30, 31 face the left front and right front leaf springs 12, 14. The trailing edges 42 of the equalizer bars face the left rear and right rear leaf springs 16, 18.

The device includes a left front link 50, a left rear link 52, a right front link 54, and a right rear link 56. The left front link 50 is pivotally coupled between the rear end 22 of left front leaf spring 12 and the left end 36 of the equalizer bar 30. The left rear link 52 is pivotally coupled between the front end 20 of left rear leaf spring 16 and the left end 36 of the equalizer bar 30. The right front link 54 is pivotally coupled between the rear end 22 of right front leaf spring 14 and the right end 38 of the equalizer bar 31. The right rear link 56 is pivotally coupled between the front end 20 of right rear leaf spring 18 and the right end 38 of the equalizer bar 31. The links 50, 52, 54, 56 enable the equalizer bars 30, 31 to rotate about their central and cross axes 44,46 when unequal load conditions exist on the leaf springs 12, 14, 16, 18.

The device includes a left and a right support bar 60, 62. Each bar has an upper end 64 and a lower end 66. The upper end 64 of each bar 30, 31 is adapted to be coupled to the frame of a vehicle. The lower end 66 of the left support bar 60 is coupled to the left end 36 of the equalizer bar 30 between the left front link 50 and the left rear link 52. The lower end 66 of the right support bar 62 is coupled to the right end 38 of the equalizer bar 30 between the right front link 54 and right rear link 56. The support bars 60, 62 confine the movement of the leaf springs 12, 14, 16, 18 in the horizontal direction.

Figure 2:
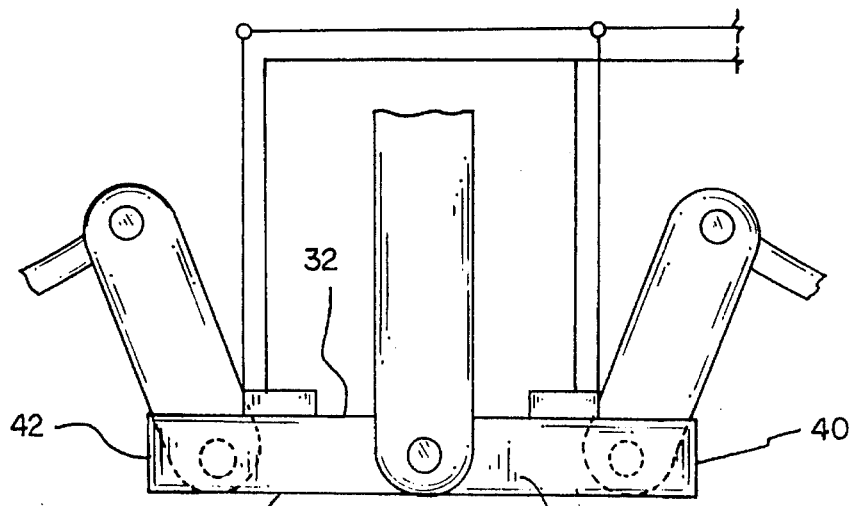
FIG. 2 is a close-up side view of the equalizer bar, the right front and right rear links, the right support bar, and right front mercury switch and right rear mercury switch of FIG. 1.
Figure 3:
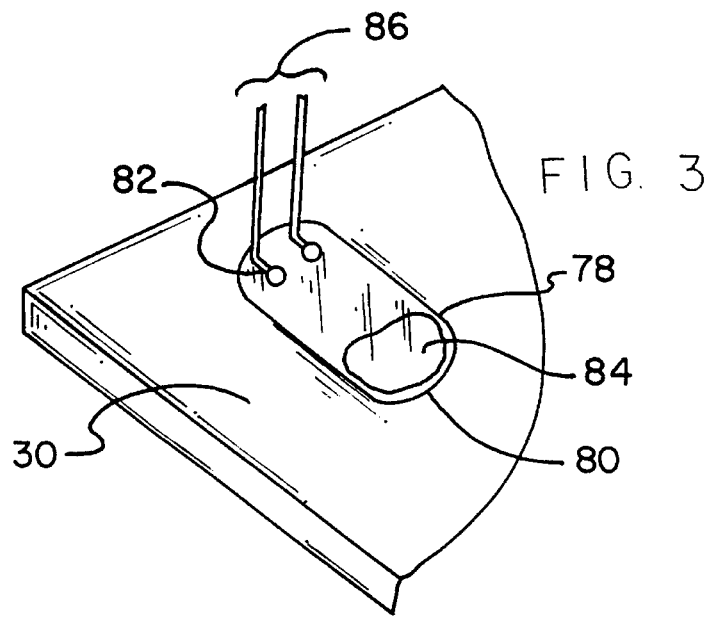
FIG. 3 is a close-up view of the mercury switch constructed in accordance with the principles of the present invention.
Figure 4:
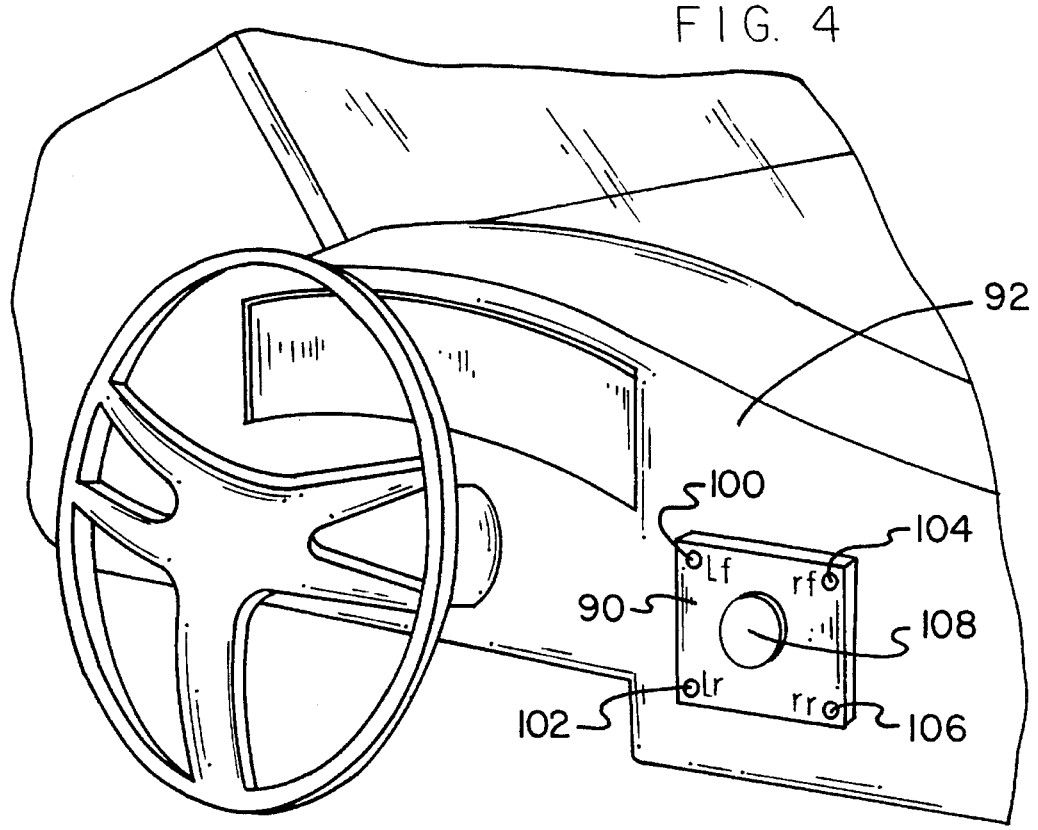
FIG. 4 is a close-up view of the indicator panel coupled to the dashboard within a driver's compartment of a vehicle.
Figure 5:
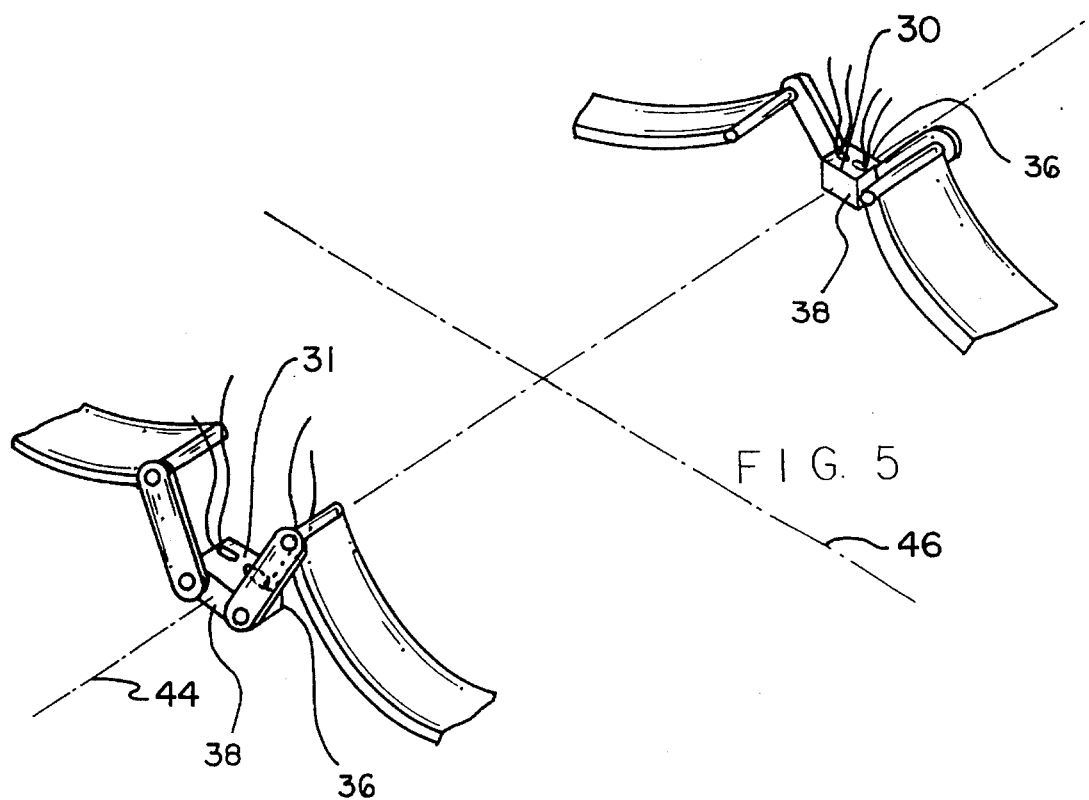
FIG. 5 is a perspective view of the present invention.
Figure 6:
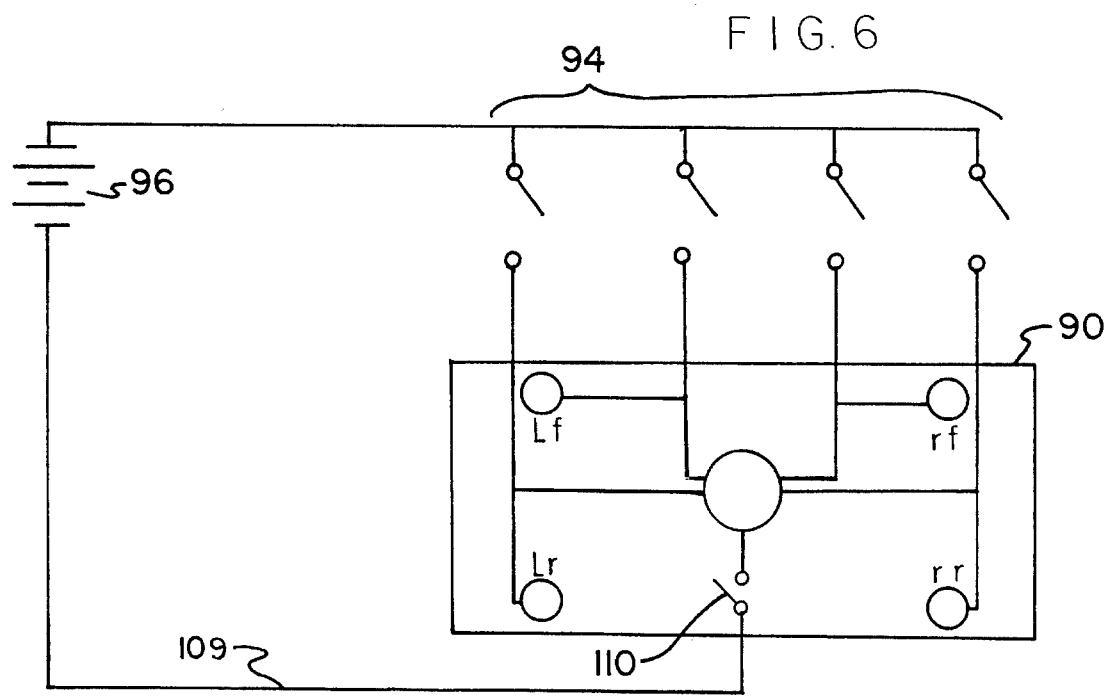
FIG. 6 is an electrical schematic of the controls for the device of the prior Figures.
Figure 7:
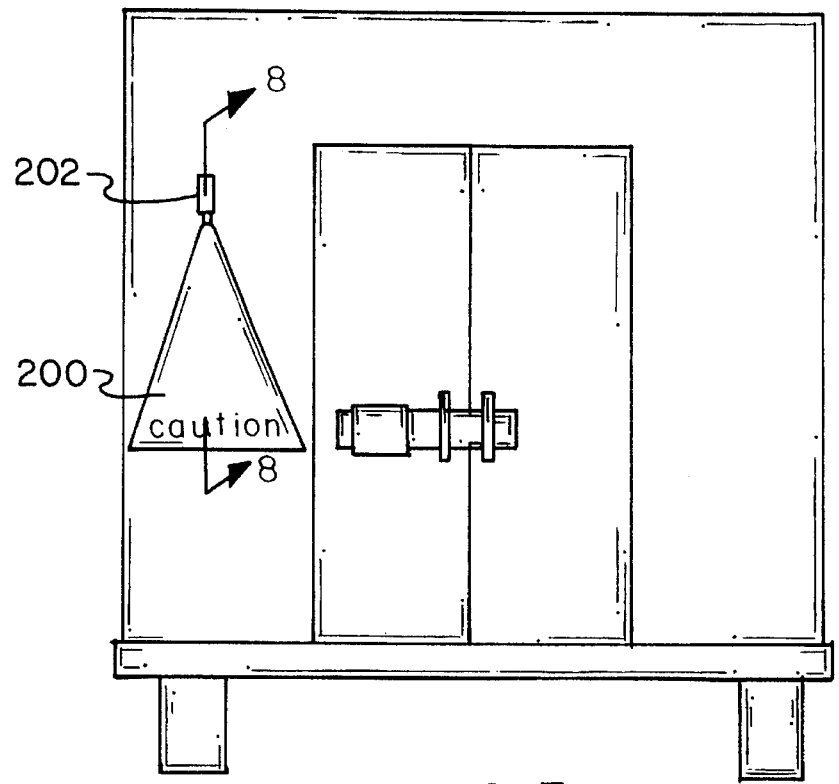
FIG. 7 is a rear elevational view of the device mounted on the rear of the truck.
Figure 8:
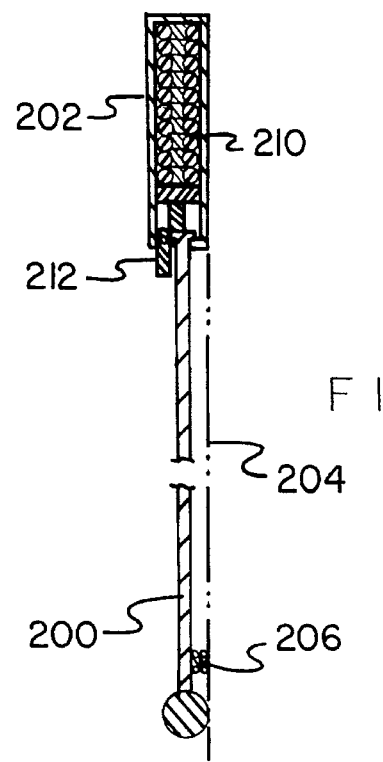
FIG. 8 is a cross sectional view taken along line 8—8 of FIG. 7.

The device includes a left front mercury switch 70, a left rear mercury switch 72, a right front mercury switch 74, and a right rear mercury switch 76. Each mercury switch further comprises an elongated, hollow, and sealed container 78 having a first end 80 and a second end 82. Liquid mercury 84 is disposed within the container to flow between the first end 80 and the second end 84 thereof when tilted. The container is fabricated to minimize the probability of leakage or breakage. A terminal 86 is coupled to the second end to contact the liquid mercury. When the mercury is contained in the first end 80, the mercury switch is disengaged. When the mercury is contained in second end 82, the mercury switch is engaged. The left front mercury switch 70 is disposed near the left end 36 of the equalizer bar 30 with the second end 82 of the switch adjacent to the leading edge 40. The left rear mercury switch 72 is disposed near the left end 36 of the equalizer bar 30 with the second end 82 of the switch adjacent to the trailing edge 42. The right front mercury 74 switch is disposed near the right end 38 of the equalizer bar 31 with the second end 82 of the switch adjacent to the leading edge 40. The right rear mercury switch 76 is disposed near the right end 38 of the equalizer bar with the second end 82 of the switch adjacent to the trailing edge 42. See FIG. 2 for an illustration of the leading edge and trailing edge of each equalizer bar.

The device includes an indicator panel 90. The indicator panel is adapted to be coupled to the dashboard 92 within a driver's compartment of a vehicle. The indicator panel further includes an indicator circuit 94 coupled thereto. The indicator circuit is adapted to be coupled to an external power source 96.

The indicator circuit further includes a left front light 100, a left rear light 102, a right front light 104, a right rear light 106, and a central light 108, and a plurality of wires 109 for supplying electrical power thereto. The left front light 100 is electrically connected in series to the left front mercury switch 70 with a wire. The left rear light 102 is electrically connected in series to the left rear mercury switch 72 with a wire. The right front light 104 is electrically connected in series to the right front mercury 74 switch with a wire. The right rear light 106 is electrically connected in series to the rear mercury switch 76 with a wire. In the preferred embodiment, the wire is connected to one portion of the switch's terminal 86, while the other portion of the terminal is grounded to the vehicle's frame. The central light 108 is electrically connected in parallel to the left front light 100 with a wire, the left rear light 102 with a wire, the right front light 104 with a wire, and the right rear light 106 with a wire. The left front light, the left rear light, the right front light, and the right rear light are adapted to provide an indication of lost pressure in a given tire. The central light is adapted to provide a indication of lost pressure in any of the tires. Other indicators, such as speakers that generate audible tones, may also be used in place of or in combination with the lights.

The device has a controller switch 110 operable in one orientation to energize the indicator circuit 94 and in another orientation to de-energize the indicator circuit. This feature allows the user the capability to turn on or shut off the system as desired.

In the preferred embodiment, the tire pressure warning system is connected under the frame and within the driver's compartment of a tandem axle vehicle. The device is then energized using an external power source 96. In the preferred embodiment the system is powered by a battery, but it may also be powered by a generator or alternator. The pressure in the tires on each axle 26 and 28 of the vehicle is then properly adjusted so that the equalizer bar 30 is placed in a position whereby the mercury 84 in the mercury switches 70, 72, 74, and 76 is disposed in the first end 80 thereof, thus disabling the electrical connection between the switches and the lights on the indicator panel 90. Now, when a tire on the vehicle loses pressure, the equalizer bar rotates about its central and cross axes 44 and 46 due to the unequal load conditions on the tires. The unequal load conditions cause the mercury in a mercury switch located in the direction of the equalizer bar rotation to travel and collect in the second end 82 of the container 78. When this occurs, an electrical connection between the terminal 86 is induced, whereby coupling the switch with the indicator circuit 94 to engage and activate the appropriate light on the indicator panel. The system can also be adjusted to such a sensitive level that the indicator lights will flicker if a user drives over a road that is too rough for the vehicle.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A new and improved tire pressure warning system for use under a frame of a tandem axle vehicle comprising:

a left front leaf spring, a right front leaf spring, a left rear leaf spring, and a right rear leaf spring, each leaf spring having a front end, a rear end, and an intermediate portion therebetween, the intermediate portions of the left and right front leaf springs adapted to be aligned with and coupled to a front axle having inflatable tires disposed thereon, the intermediate portions of the left and right rear leaf springs adapted to be aligned with and coupled to a rear axle having inflatable tires disposed thereon, the front ends of the right front and left front leaf springs and the rear ends of the right rear and left rear leaf springs adapted to be offset and coupled to the frame of a tandem axle vehicle;

a left and a right equalizer bar, each equalizer bar having an elongated and generally rectangular shape and an upper surface, a lower surface, a leading edge, a trailing edge, a central axis defined between the leading and trailing edges, and a cross axis defined perpendicular to the central axis, the left equalizer bar disposed between and offset below the rear end of the left front leaf spring and front end of the left rear leaf spring, the right equalizer bar disposed between and offset below the rear end of the right front leaf spring and the front end of the right rear leaf spring, the leading edge of the left and right equalizer bars facing the left front and right front leaf springs, respectively, and the trailing edge of the left and right equalizer bars facing the left rear and right rear leaf springs, respectively;

a left front link, a left rear link, a right front link, and a right rear link, the left front link pivotally coupled between the rear end of left front leaf spring and the left equalizer bar near the leading edge thereof, the left rear link pivotally coupled between the front end of left rear leaf spring and the left equalizer bar near the trailing edge thereof, the right front link pivotally coupled between the rear end of right front leaf spring and the right equalizer bar near the leading edge thereof, the right rear link pivotally coupled between the front end of right rear leaf spring and the right equalizer bar near the trailing edge thereof, the links enabling the equalizer bars to rotate about their central and cross axes when unequal load conditions exist on the leaf springs;

a left and a right support bar, each bar having an upper end and a lower end, the upper end of each bar adapted to be coupled to the frame of a vehicle, the lower end of the left support bar coupled to the left equalizer bar between the left front link and the left rear link, the lower end of the right support bar coupled to the right equalizer bar between the right front link and right rear link;

a left front mercury switch, a left rear mercury switch, a right front mercury switch, and a right rear mercury switch, each mercury switch further comprising an elongated, hollow, and sealed container having a first end and a second end, liquid mercury disposed within the container to flow between the first end and the second end thereof when tilted, and a terminal coupled to the second end to contact the liquid mercury, whereby when the mercury is contained in the first end, the mercury switch is disengaged, and when the mercury is contained in second end, the mercury switch is engaged, the left front mercury switch disposed upon the upper surface of the left equalizer bar with the second end of the switch positioned adjacent to the leading edge, the left rear mercury switch disposed upon the upper surface of the left equalizer bar with the second end of the switch positioned adjacent to the trailing edge, the right front mercury switch disposed upon the upper surface of the right equalizer bar with the second end of the switch positioned adjacent to the leading edge, and the right rear mercury switch disposed upon the upper surface of the right equalizer bar with the second end of the switch positioned adjacent to the trailing edge;

a plurality of wires adapted to carry electrical power from an external power source;

an upstanding planar rectangular indicator panel having an upper left corner, a lower left corner, an upper right corner, and a lower right corner, the indicator panel adapted to be coupled to the dashboard within a driver's compartment of a vehicle, the indicator panel further having an indicator circuit coupled thereto, the indicator circuit adapted to be coupled to an external power source, the indicator circuit further comprising:

a left front light coupled to the upper left corner of the indicator panel, a left rear light coupled to the lower left corner of the indicator panel, a right front light coupled to the upper right corner of the indicator panel, a right rear light coupled to the lower right corner of the indicator panel, and a central light coupled to the center of the indicator panel, the left front light electrically connected in series to the left front mercury switch with a wire, the left rear light electrically connected in series to the left rear mercury switch with a wire, the right front light electrically connected in series to the right front mercury switch with a wire, the right rear light electrically connected in series to the rear mercury switch with a wire, the central light electrically connected in parallel to the left front light with a wire, the left rear light with a wire, the right front light with a wire, and the right rear light with a wire, the left front light, the left rear light, the right front light, and the right rear light adapted to provide an indication of lost pressure in a given tire, the central light adapted to provide a indication of lost pressure in any of the tires, and a controller switch operable in one orientation to energize the indicator circuit and in another orientation to de-energize the indicator circuit, whereby when the tire pressure warning system is coupled to a vehicle and energized, and a tire on the vehicle loses pressure, the equalizer bar rotates about its central and cross axes due to the unequal load conditions on the tires, causing the mercury switch located in the direction of equalizer bar rotation to engage and activate the central light and one of the lights positioned in one of the corners on the indicator panel.

* * * * *